(12) United States Patent
Flournoy

(10) Patent No.: US 8,104,522 B2
(45) Date of Patent: Jan. 31, 2012

(54) FLUID EXCHANGE MACHINE WITH GRAPHICAL DISPLAY

(75) Inventor: Matthew Michael Flournoy, South Bend, IN (US)

(73) Assignee: Norco Industries, Inc., Compton, CA (US)

( * ) Notice: Subject to any disclaimer, the term of this patent is extended or adjusted under 35 U.S.C. 154(b) by 465 days.

(21) Appl. No.: 12/342,341

(22) Filed: Dec. 23, 2008

(65) Prior Publication Data

US 2010/0154927 A1 Jun. 24, 2010

(51) Int. Cl.
*B65B 3/04* (2006.01)

(52) U.S. Cl. ............... 141/98; 141/95; 141/65; 184/1.5

(58) Field of Classification Search ............. 141/18, 141/65, 84, 98, 192, 198, 94, 95, 67; 181/1.5
See application file for complete search history.

(56) References Cited

U.S. PATENT DOCUMENTS

| | | | | |
|---|---|---|---|---|
| 5,586,583 A * | 12/1996 | Edwards et al. | ............... | 141/83 |
| 6,035,903 A * | 3/2000 | Few et al. | ......... | 141/98 |
| 6,123,174 A * | 9/2000 | Elkin et al. | ....... | 184/1.5 |
| 6,935,388 B2 * | 8/2005 | Camacho et al. | ............... | 141/98 |
| 7,096,894 B1 * | 8/2006 | Hollub et al. | .......... | 141/65 |
| 7,111,650 B2 * | 9/2006 | Few | ............... | 141/98 |

* cited by examiner

*Primary Examiner* — Timothy L Maust
*Assistant Examiner* — Timothy Kelly
(74) *Attorney, Agent, or Firm* — Fulwider Patton LLP

(57) ABSTRACT

A fluid exchange machine for removing used transmission fluid from a vehicle's cooling system and replacing the used fluid with fresh fluid includes a fresh fluid tank, a used fluid tank, a pump for forcing fresh fluid from the fresh fluid tank to a vehicle's cooling system, a processor for controlling a fluid exchange operation, and a display coupled to said processor for graphically representing a status of the fluid exchange operation. The display can be an LCD display or other display capable of graphical representation of the conditions and status of the fluid exchange operation.

9 Claims, 4 Drawing Sheets

FLUID EXCHANGE MACHINE WITH GRAPHICAL DISPLAY

BACKGROUND

Automatic transmissions and other vehicular fluid system components frequently require servicing such as replacing used fluid with fresh fluid in order to properly maintain them and extend the life of the component and associated vehicle. Early attempts at developing automatic transmission fluid transfer machines often resulted in relatively lengthy and complicated procedures. Many of these early devices required significant manual operation and supervision as the operator had to continually monitor gauges and other instruments to monitor the fluid flow to achieve the desired performance.

Recently there have been numerous advances in the field of fluid exchange machines. U.S. Pat. No. 7,111,650 to Few, assigned to the assignee of the present application, discloses a radiator fluid exchanging apparatus that includes a fresh fluid supply tank, and used fluid supply tank, pumps, and fluid lines for exchanging the old fluid and replacing it with new transmission fluid. The '650 Patent is fully incorporated herein by reference. The general mechanics of replacing fluid in a transmission is well known in the art and is substantially set forth in the cited reference, and a discussion of the plumbing of the fluid exchange machine is unnecessary to the understanding of the present invention. Only the details of the operation of the machine necessary for an understanding of the present invention is provided here.

Many of the prior art fluid exchange machines were satisfactory for efficiently replacing the transmission fluid. However, those using the machines on a daily basis constantly look to ways to automate the procedure and make the operation more streamline. For example, a processor was added to these machines to control the fluid exchange operation, monitoring the pumps and fluid levels to promote a fluid exchange where the fluid added to the system was approximately equal to the fluid taken from the system. This is important when the fluid exchange occurs while the vehicle engine is running, ensuring that adequate cooling fluid is present at all times and that the engine will not overheat. While many of these devices have also proven satisfactory in their performance there remains a need for the operator to have more control over the fluid exchange operation and to be able to control the operation to a higher degree than prior machines. The ability to control the fluid exchange relies on the user having as much information as possible in an easy to understand manner. The present invention is an advance in vehicle fluid exchange machines that incorporates greater feedback from the machine in a textual or graphical output, and thus allows the user to have more control over the fluid exchange operation.

SUMMARY OF THE INVENTION

The present invention is a transmission fluid exchange machine that includes a new fluid tank, a used fluid tank, a pump for pumping new fluid into a vehicle's transmission system, and a processor for regulating the fluid exchange operation. The present invention further comprises a control panel with a graphical display that provides real-time graphical status updates on the progress of the fluid exchange operation and the status of the fluid exchange machine. The graphical status updates includes amount of new fluid introduced, amount of used fluid extracted, textual instructions for carrying out the fluid exchange operation, and other features and options of the machine. In a preferred embodiment, the machine also includes a memory that stores the information related to the progress of the fluid exchange in a ROM or persistent data memory that retains the information in the event of a loss of power, enabling the machine to return to the point in the fluid exchange machine and continue the fluid exchange after power is returned to the machine.

DETAILED DESCRIPTION OF THE PREFERRED EMBODIMENTS

Figure 1:
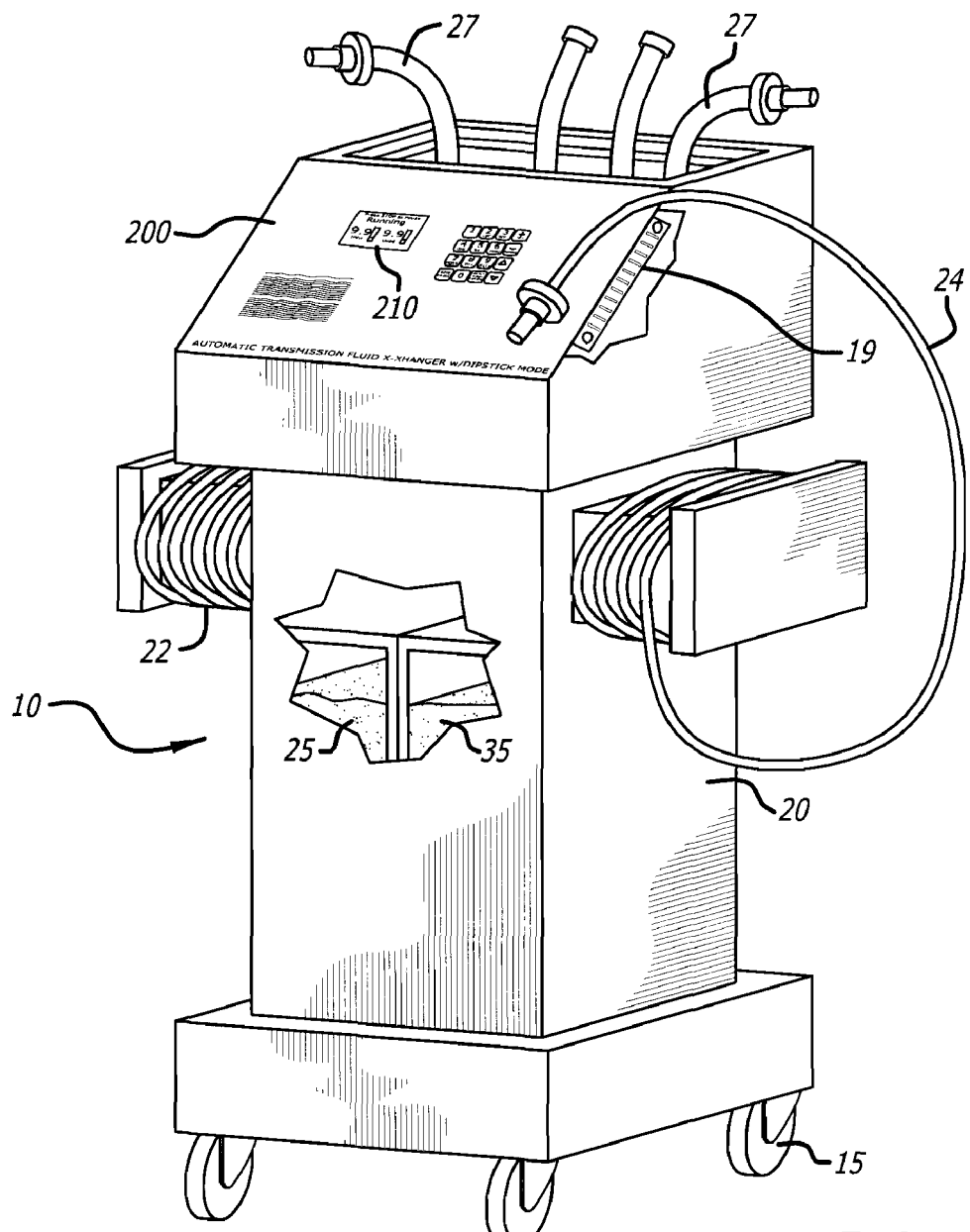
FIG. 1 is an elevated, perspective view, partially exposing an interior of the housing, of a first preferred embodiment of the present invention.

The present invention is a fluid exchange machine that is adapted to add fresh transmission fluid to a vehicle and withdraw used transmission fluid from the vehicle, and incorporates a display that provides textual and graphical feedback as to the status and options of the machine's operation. FIG. 1 shows a machine 10 for carrying out the objects of the invention including a housing 20 supported on casters or wheels 15 for rolling the machine into position next to a vehicle's engine (not shown). The housing 20 is made of a durable plastic, metal, or other material that will resist corrosion in the presence of automotive fluids while providing a lightweight body that can easily be wheeled around the garage or work station. The housing 20 encloses two fluid tanks as is known in the art, a used fluid container 25 into which old fluid in the vehicle's transmission is pumped during the fluid exchange operation, and a new fluid tank 35 supply of fresh fluid to be pumped into the vehicle's transmission. The pumping of the old fluid and the replenishing of the new fluid preferably occurs sequentially, although other known methods for replacing the fluid include simultaneous fluid exchange is also known in the art. An evacuation hose 22 and a fill hose 24 are provided that connect the two tanks, and the machine can include a variety of adapter fittings 27 to accommodate different types and makes of vehicle transmissions. The machine also includes a control panel 200 and a microprocessor 19 that control the operation of the machine and the display 210 described in more detail below.

Figure 2A:
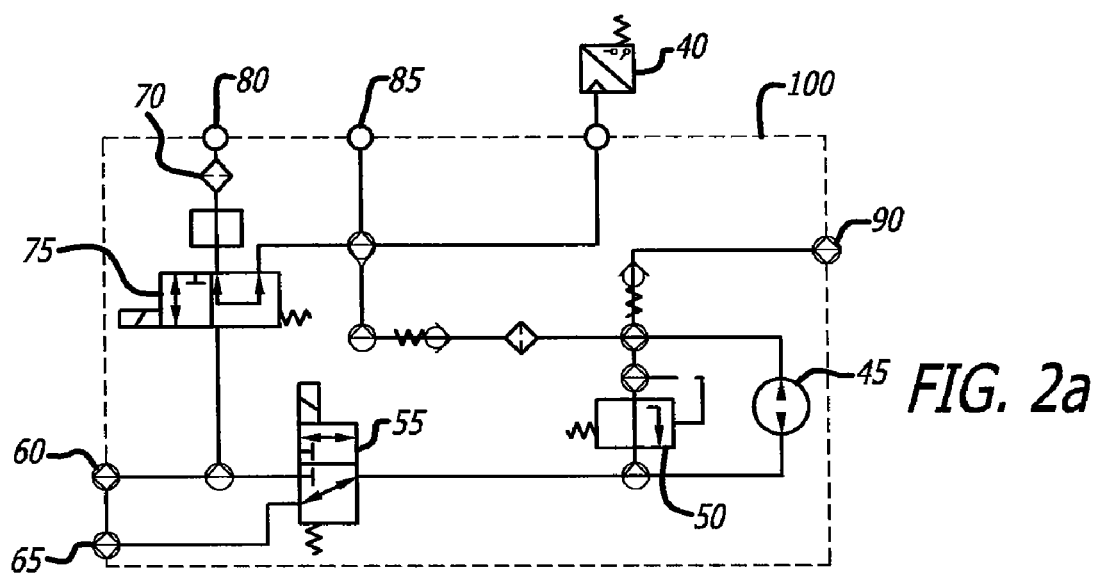
FIG. 2a is a schematic of manifold diagram of the embodiment of FIG. 1.
Figure 2B:
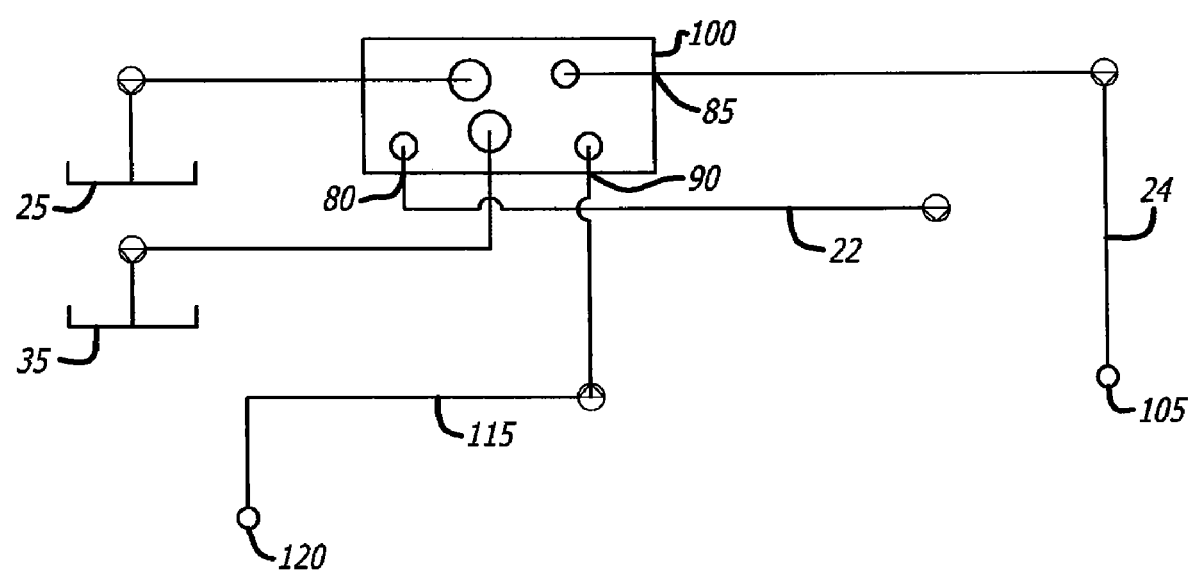
FIG. 2b is a schematic of a flow diagram of the embodiment of FIG. 1.

FIG. 2a is a schematic of a manifold diagram for the fluid exchange machine 10. The used fluid tank 25 is connected to outlet 60 of manifold 100 and the new fluid tank 35 is connected to inlet 65. A dual direction solenoid 55 controls the direction of the flow into and out of the tanks, where the solenoid is connected to a microprocessor 19 within the housing 20 below the control panel. Pump 45 is preferably a reversible pump that can pump both incoming and outgoing fluid, so fluid is first pumped from the vehicle's transmission through the manifold at entrance 80, filter 70, and through a solenoid 75 and out outlet 60 to the used fluid tank 25. New fluid from the new fluid tank 35 is then pumped into the vehicle's system through inlet 65 and solenoid 55, across relief valve 50 and out through exit 85. Pressure switch 40 regulates the flow in the manifold 100. Exit 90 is part of an alternate flow path that feeds fluid to the transmission dipstick rather than on a port on the transmission. In FIG. 2b, manifold 100 is connected to used fluid tank 25 and new fluid tank 35 by respective conduits. New fluid line 24 carries new fluid from manifold 100 to the vehicle's transmission at a connection with a port 105 on the transmission (not shown), and used fluid line 22 returns used fluid from a port 110 on the transmission to the manifold 100. Alternate fluid exchange passage line 115 introduces fluid from the manifold 100 to the vehicle's transmission dipstick 120 in place of the fluid line 24.

Figure 3:
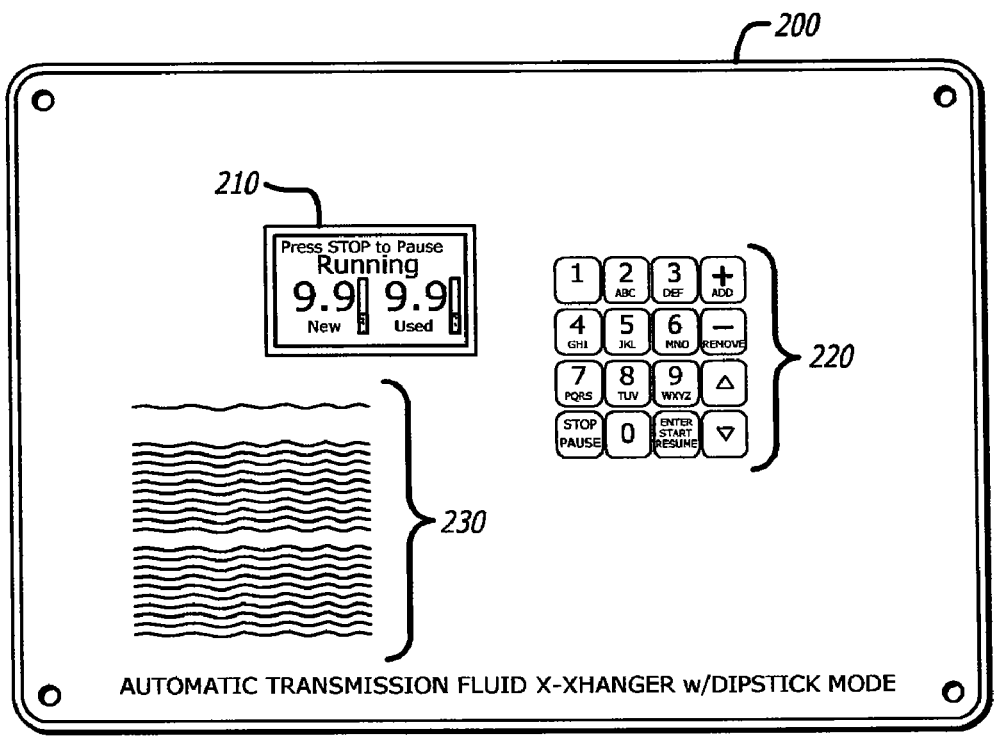
FIG. 3 is an enlarged, front view of the display panel of the embodiment of FIG. 1.

The control panel 200 is shown in FIG. 3 and includes a display screen 210 such as a liquid crystal display (LCD) or light emitting diode (LED) display for creating graphical images to be relayed to the user. A keypad 220 is provided to allow the user to enter information into a microprocessor (not shown) located below the control panel 200. The microprocessor is connected to the display screen 210 to drive the display and provide information set forth in more detail below. The control panel 200 is also preferably provided with written instructions for initiating the start-up sequence and any hazard warnings or operational information needed prior to activation of the display screen 210.

Figure 4:
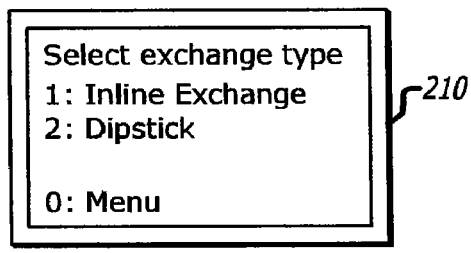
FIGS. 4-12 are display screen shots of information relayed from the machine to the operator using the display panel of FIG. 3.

The display screen 210 provides the user with a wealth of information on the status and progress of the fluid exchange operation, including exemplary screens shown in FIGS. 4-12. Once the machine's power has been activated, a start-up screen such as that shown in FIG. 4 is displayed to the user. Start-up screen includes a listing of two types of fluid exchanges, an inline fluid exchange (1) and a dipstick fluid exchange (2). The inline fluid exchange uses hose 24 to direct new transmission fluid directly into the vehicle's transmission whereas the dipstick fluid exchange delivers new fluid through the transmission's dipstick port. The start-up screen also includes a "menu" option (0) for accessing a main menu. The user can use the keypad 220 to enter the appropriate number and select the fluid exchange option or access the main menu.

Figure 5:
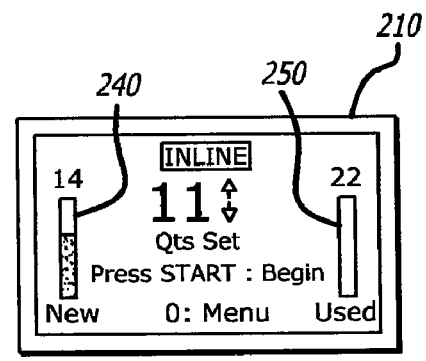
Figure 6:
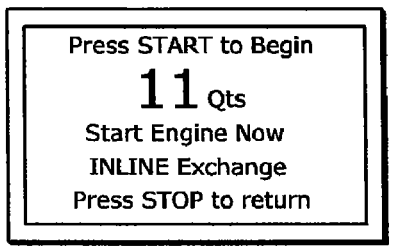
Figure 7:
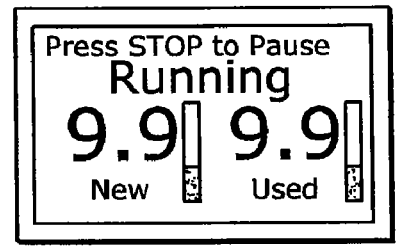
Figure 9:
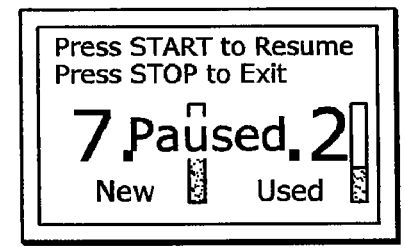

The screen 210 then displays a graphical representation of the used fluid tank level and the new fluid tank level, or a graphical representation of the respective amounts of fluid to be added and subtracted from the vehicle's transmission. For example, in FIG. 5 a new fluid bar 240 and a used fluid bar 250 are shown along with a numerical value of units of fluid to be exchanged, which can be adjusted with the arrow keys on the keypad 220. The display screen in FIG. 5 shows "11" quarts of fluid to be exchanged, but the adjacent arrows signify to the user that the value can be increased or decreased with the keypad. Once the "ENTER" key on the keypad is depressed, a new screen such as FIG. 6 confirms the eleven quart fluid exchange and that the type of exchange is an "INLINE" exchange, and instructs the user to start the vehicle's engine. Once the "START" button is pressed, the screen switches to that shown in FIG. 7, which shows the status of the fluid exchange in graphical form. For example, a new fluid bar may increase from zero to eleven quarts while the used fluid bar similarly increases from zero to eleven quarts as the status "RUNNING" is displayed. The screen display of FIG. 7 is constantly updated throughout the fluid exchange operation to convey to the user exactly what the status and progress of the fluid exchange in real time. A textual message instructs the user to "PRESS STOP TO PAUSE" the operation if it should be necessary to temporarily halt the fluid exchange. If the stop button is depressed, a screen such as that shown in FIG. 9 shows the word "PAUSED" overlaid over the status screen to indicate that the fluid exchange operation has been temporarily halted by the user. The screen of FIG. 9 also instructs the user to depress the "START" button to resume the fluid exchange operation.

Figure 8:
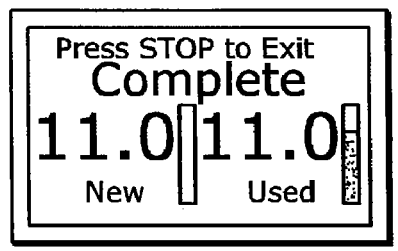
Figure 10:
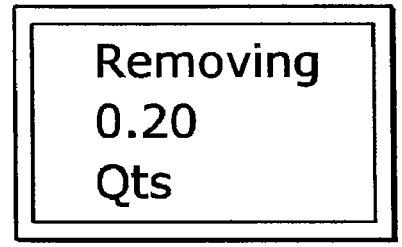
Figure 11:
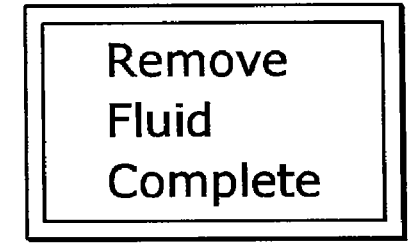
Figure 12:
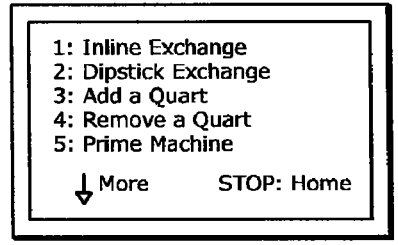

Once the fluid exchange is complete, a screen such as that shown in FIG. 8 shows the amount of new fluid added ("11") and the amount of used fluid extracted ("11"), as well as status bars graphically depicting the result of the fluid exchange. The work "COMPLETE" is displayed to signify that the fluid exchange operation has terminated successfully. At this point, the user can inspect the fluid dipstick in the transmission to check the level of the fluid, and add or extract fluid to adjust the level. In FIG. 10, a sample screen shows that the screen can also extract 0.2 quarts of fluid incrementally from the transmission to bring down the fluid level. Fluid could also be added in intervals such as 0.2 quarts, although different quantities and different units of measurements (liters, etc.) could also be displayed without departing from the scope of the invention. Once the 0.2 quarts of fluid is successfully extracted, the screen can display a message such as that shown in FIG. 11 indicating that the fluid removal is completed. The main menu (0) is depicted in FIG. 12, which provides the user with the option of an inline or dipstick exchange operation, and to add or remove fluid from the vehicle's transmission system. The machine also offers a priming operation that can be selected from the main menu by entering the number "5" on the keypad. More instructions and options can be accessed from the main menu by depressing the down arrow key on the keypad.

A second improvement on the machine is the addition of a ROM or data persistent memory to the processor to allow the processor to acquire and keep data pertaining to the fluid exchange operation that will not be lost in the event of a power outage or unexpected disruption of power to the machine. The use of the data persistent memory retains the resident data, which is preferably updated by the microprocessor continuously during the fluid exchange operation. In the event of a sudden or unexpected power outage, the processor initially looks to the data persistent memory to determine if the most recent fluid exchange operation was successfully completed or interrupted. If it was interrupted, the microprocessor causes the display 210 to ask the user if the user wants to continue with the previous fluid exchange operation. If so indicated, the memory restores the conditions to the most recently saved data and continues with the fluid exchange operation without further input from the user. This option can save the user a significant amount of time in the event of a power interruption, where the machine simply continues as if no interruption had occurred.

The present invention is an improvement over prior art fluid exchange machines that use flashing indicator lights to convey the status of a fluid exchange operation. The LCD or other screen type allows graphical representations of the fluid exchange operation, providing the user with more information in a more easily viewed format. The machine also can resume operation after a power interruption without the loss of data using a memory associated with the microprocessor that uses a data persistent memory.

The foregoing descriptions are intended to be exemplary but not limiting in the scope of the present invention. It is anticipated that one of ordinary skill in the art, for example, would readily conceive of variations and modifications to the above-referenced disclosure while keeping with the scope of the present invention, and the present invention is intended to include all such variations and modifications. Accordingly, the scope of the invention should be measured by the words of the appended claims, using the common and ordinary usage of the words in the claims, and should not be limited in any manner to any particular described embodiment or method herein.

I claim:

1. A fluid exchange machine for removing used transmission fluid from a vehicle's cooling system and replacing the used transmission fluid with fresh fluid, comprising:
   a fresh fluid tank;
   a used fluid tank;
   a pump for forcing fresh fluid from the fresh fluid tank to a vehicle's cooling system;
   a processor for controlling a fluid exchange operation; and
   a display coupled to said processor for graphically representing a status of the fluid exchange operation, the display including a first amount indicator graphically showing a quantity of new transmission fluid delivered to the vehicle's cooling system and a second amount indicator graphically showing a quantity of used transmission fluid extracted from the vehicle's cooling system, said first and second amount indicators displaying the amounts in real time as the fluid exchange operation progresses.

2. The fluid exchange machine of claim 1 wherein the display is a liquid crystal display.

3. The fluid exchange machine of claim 1 wherein the display includes a progress indicator showing the progress of the fluid exchange operation.

4. The fluid exchange machine of claim 1 further comprising a memory in which data from the fluid exchange operation is stored and retained in the event of a power interruption, the processor accessing said memory to restart the fluid exchange operation after power is restored to the machine.

5. The fluid exchange machine of claim 1 further comprising a fluid adding indicator on said display where fluid can be added to the vehicle's cooling system, and the fluid adding indicator indicates the amount of fluid to be added and indicates when the fluid adding is complete.

6. The fluid exchange machine of claim 1 further comprising a fluid extracting indicator on said display where fluid can be extracted from the vehicle's cooling system, and the fluid extracting indicator indicates the amount of fluid to be removed and indicates when the fluid extraction is complete.

7. The fluid exchange machine of claim 1 further comprising a graphical setting on the display indicating an amount of fluid to be exchanged in the fluid exchange operation, and a keypad to adjust the amount of fluid to be exchanged.

8. The fluid exchange machine of claim 1, further comprising a display comprising a fluid exchange operation option for displaying an option of an inline fluid exchange operation and for displaying an option of a dipstick fluid exchange operation, and a keypad for selecting from among the displayed options.

9. The fluid exchange machine of claim 1 further comprising a display having both a numerical status indicator and a graphical status indicator showing the progress of the fluid exchange operation.

* * * * *